(12) United States Patent
Cai et al.

(10) Patent No.: US 10,727,910 B2
(45) Date of Patent: Jul. 28, 2020

(54) METHOD AND DEVICES IN A WIRELESS COMMUNICATION SYSTEM

(71) Applicant: Huawei Technologies Co., Ltd., Shenzhen (CN)

(72) Inventors: Tao Cai, Kista (SE); Majid Nasiri Khormuji, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/405,683

(22) Filed: May 7, 2019

(65) Prior Publication Data

US 2019/0334584 A1    Oct. 31, 2019

Related U.S. Application Data

(63) Continuation of application No. PCT/EP2016/076829, filed on Nov. 7, 2016.

(51) Int. Cl.
*H04B 7/0426* (2017.01)
*H04B 7/06* (2006.01)
*H04W 24/10* (2009.01)

(52) U.S. Cl.
CPC .......... *H04B 7/043* (2013.01); *H04B 7/0639* (2013.01); *H04B 7/0695* (2013.01); *H04W 24/10* (2013.01)

(58) Field of Classification Search
CPC ....... H04B 7/04; H04B 7/0404; H04B 7/0606
See application file for complete search history.

(56) References Cited

U.S. PATENT DOCUMENTS

| 7,948,444 B2 | 5/2011 | Signell et al. |
| 8,369,271 B2 | 2/2013 | Borst et al. |
| 2004/0048635 A1 | 3/2004 | Goldberg |
| 2017/0244455 A1* | 8/2017 | Urzhumov ........... H04B 7/0413 |

FOREIGN PATENT DOCUMENTS

| CN | 1898838 A | 1/2007 |
| EP | 3032863 A1 | 6/2016 |
| WO | 2017186301 A1 | 11/2017 |

OTHER PUBLICATIONS

Bohagen et al, "Design of Optimal High Rank Line-of-Sight MIMO Channels", IEEE Transactions on Wireless Communications, 6 (4): 1420-1425 (Apr. 2007).

* cited by examiner

*Primary Examiner* — Kevin Kim
(74) *Attorney, Agent, or Firm* — Leydig, Voit & Mayer, Ltd.

(57) ABSTRACT

A method and a control unit are provided. The control unit is configured to receive a latency related measurement value; determine an antenna configuration parameter for a transceiver, wherein either select a switching based adjustment based on a configuration mode, when the received latency related measurement value exceeds a threshold level, or when the received latency related measurement value is below the threshold level, select the antenna configuration parameter for a motorised electromechanical adjustment.

19 Claims, 7 Drawing Sheets

METHOD AND DEVICES IN A WIRELESS COMMUNICATION SYSTEM

CROSS REFERENCE TO RELATED APPLICATIONS

This application is a continuation of International Application No. PCT/EP2016/076829, filed on Nov. 7, 2016, the disclosure of which is hereby incorporated by reference in its entirety.

TECHNICAL FIELD

Embodiments of the disclosure generally relate to a control unit, a method therein, a switching unit and a transceiver. More in particular, they pertain to a mechanism for selecting between a switching based adjustment of an antenna configuration parameter of a transceiver, and a motorised electromechanical adjustment thereof.

BACKGROUND

In the context of next generation wireless network, with a targeted commercialisation time around year 2020-2025, millimetre wave radio is considered to be used for the purpose of e.g. establishing a backhaul link for an access point/network node, as well as the access link between the access point/network node and a mobile terminal. The backhaul nodes may be e.g. aggregation and non-aggregation backhaul nodes. The non-aggregation backhaul node is usually associated with an access node (or access point, or base station, or Node B or eNode B/eNB). The backhaul nodes can be installed e.g. on building walls or lamp posts while the aggregation nodes can be installed on a building top. The aggregation backhaul node is used to aggregate signals from multiple non-aggregation backhaul nodes. The aggregated backhaul signals are then transported further to other network nodes for processing.

Millimetre wave is the radio wave with wavelength between 1 mm and 10 mm, corresponding to frequencies from 30 GHz to 300 GHz. Due to the large chunk of available spectrum bands, millimetre wave is preferable for carrying high bit rate data on the backhaul link. However, it may be noted that spectrum bands other than bands between 30 GHz and 300 GHz can also be used for the backhaul link. Equipment and methods can be used for those bands in the same principle as disclosed.

Backhaul link is one of favourable use cases for millimetre wave communications as the nodes are usually fixed and there are Line of Sight (LoS) links between nodes. Nevertheless, millimetre wave communications can be used for access links as well.

Backhaul link between the backhaul node and the aggregation node shall provide very high data transmission capability to support high data services for future generation mobile devices. For example, in case of so-called "front hauling" scenario where the radio frequency signals to/from mobile devices are directly sampled and sent from/to central processing units, the data transmission requirement is much higher than a usual "back hauling" scenario where only baseband signals are sampled.

One way to boost channel capacity of millimetre wave based backhaul link is to use Multiple-Input-Multiple-Output (MIMO) configuration (and very often LoS MIMO) for transmitter and receiver of the backhaul link. One typical LoS MIMO system is using Uniform Linear Arrays (ULAs) for transmitter and receiver.

In such a system, the transmitter and the receiver antenna arrays comprise multiple antenna sub-arrays. The subarrays are using multiple antenna elements to form narrow beams. The inter-subarrays distance is $D_t$ and $D_r$ respectively for transmitter and receiver. The parameters $\theta_t$ and $\theta_r$ are the down tilting angles for transmit antenna and for receive antenna respectively, as illustrated in FIG. 1, depicting a transmitter and receiver antenna arrays.

A narrower beam width is achieved with a higher number of antenna elements in the array. Advantages therewith comprise increased interference protection and spectrum reuse via boosted beamforming gains. The highly directional and narrow radiation pattern from high-order millimetre wave MIMO radios allows many radio devices to be deployed near each other without causing troublesome interference even when they are using the same frequencies.

Narrower beam is beneficial for the purpose of providing higher antenna gains, causing less multi-path fading as well as minimising cross link interference. To establish and maintain a link between transmitter and receiver via narrow beam requires however consideration for the design, operation and optimisation of the millimetre wave radio system.

To adjust antenna elements of the transmitter by motorised electromechanical adjustments is known. However, these adjustments take time.

However, the direction of the antenna beam may change in a possibly fast and unpredictable manner, in particular when the transmitter and/or the receiver is mobile. The transmitter and the receiver may be moved around, in relation to each other, linearly and also turned around angularly around different axis. In order to establish and uphold the radio connection between transmitter and receiver, it is important to direct antenna beam of the transmitter/receiver towards each other quickly, when the relative movements between transmitter and receiver is fast.

In case the connection link between transmitter and receiver is lost, there is no convenient way of recovering the lost connection link, besides restarting the whole access process.

Also, nodes which traditionally are not regarded as "mobile" such as a backhaul node and/or access node situated e.g. in lamp posts, poles, masts or similar, may be moving in relation to each other due to e.g. windy conditions, earth quake, land slide or similar phenomenon, which in some cases may cause a lost communication link if transmitter/receiver antenna elements are not adjusted fast enough.

It would thus be desired to encounter a faster way of adjusting antenna elements of a transmitter/receiver in order for millimetre radio to become feasible.

SUMMARY

It is therefore an object to obviate at least some of the above-mentioned disadvantages and to improve the performance in a wireless communication system.

This and other objects are achieved by the features of the appended independent claims. Further implementation forms are apparent from the dependent claims, the description and the figures.

According to a first aspect, a control unit is provided. The control unit is configured to receive a latency related measurement value. Further, the control unit is configured to determine an antenna configuration parameter for a transceiver, wherein either select a switching based adjustment based on a configuration mode, when the received latency related measurement value exceeds a threshold level, or when the received latency related measurement value is below the threshold level, select the antenna configuration parameter for a motorised electromechanical adjustment.

Because the selection between switching based adjustment when quick adjustments are required and motorised electromechanical adjustment when latency requirements are less strict may be made, the switching into a configuration mode of pre-set antenna configuration parameter/-s may thus be made quick, however possibly not at an optimal operating point (e.g. the configuration with the highest channel capacity), thereby enabling instant establishment/uphold a communication link between involved transceivers.

In a first possible implementation of the control unit according to the first aspect, the control unit is configured to select the configuration mode from a set of configuration modes, wherein the configuration mode further comprises a predetermined antenna configuration parameter.

Thereby, the most accurate configuration mode, i.e. predetermined antenna configuration parameter/-s may be switched into.

In a second possible implementation of the control unit according to the first possible implementation of the first aspect, the control unit is configured to receive a channel capacity measurement value and select the configuration mode from the set of configuration modes, with the highest relative channel capacity with respect to the channel capacity measurement value.

The most accurate configuration mode, i.e. predetermined antenna configuration parameter/-s resulting in the highest relative channel capacity may be switched into.

In a third possible implementation of the control unit according to the first aspect or any previously presented implementation thereof, the control unit is configured to perform the motorised electromechanical adjustment if previous adjustment was the switching adjustment otherwise perform switching adjustment if previous adjustment was the motorised electromechanical adjustment.

A quick switch into a relatively accurate configuration mode, i.e. predetermined antenna configuration parameter/-s may be made, which may be followed by a fine-tuning to optimal parameter values by motorised electromechanical adjustment. Thereby a combination of speed and optimal channel capacity is reached. Also, such combination of switching and motorised adjustment may lead to the possibility of using motors with low performance than in conventional solutions with high power motor, leading to cheaper implementation costs. Also, the size of the motors may be reduced, which is an advantage in particular in portable transceivers, as portability is enhanced.

In a fourth possible implementation of the control unit according to the first aspect or any previously presented implementation thereof, the control unit is configured to set the threshold level based on historical antenna configuration parameters.

The setting of the threshold level, and thereby also the selection between switching based adjustment and motorised electromechanical adjustment of the antenna configuration parameter is adapted to statistical use in the communication between the transceivers.

In a fifth possible implementation of the control unit according to the first aspect or any previously presented implementation thereof, the control unit is configured to set the threshold level based on feedback exchanged between at least two transceivers.

Because of the exchange of feedback, an adaptation to current conditions may be made.

In a sixth possible implementation of the control unit according to the first aspect or any previously presented implementation thereof, the control unit is configured to set the threshold level based on at least one of a network load and a number of active user equipment.

By setting the threshold level an adaptation of the selection between switching based adjustment and motorised electromechanical adjustment of the antenna configuration parameter is made with the amount of communication in mind, which adapts to altering user population behaviour and their traffic demand in the network.

In a seventh possible implementation of the control unit according to the first aspect or any previously presented implementation thereof, the latency related measurement value, comprises at least one of a capability parameter, latency requirement, and measurements of channel capacity.

According to a second aspect, a method in a control unit is provided. The method comprises receiving a latency related measurement value. Further, the method also comprises determining an antenna configuration parameter for a transceiver wherein either select a switching based adjustment based on a configuration mode, when the received latency related measurement value exceeds a threshold level, or when the received latency related measurement value is below the threshold level, select the antenna configuration parameter for a motorised electromechanical adjustment. This latency related measurement value can be determined by the control unit based on static service quality requirement, historical statistics of service quality or even real-time observation of service quality, i.e. the latency related measurement value can be adaptively modified.

Because the selection between switching based adjustment when quick adjustments are required and motorised electromechanical adjustment when latency requirements are less strict may be made, the switching into a configuration mode of pre-set antenna configuration parameter/-s may thus be made quick, however possibly not at an optimal channel capacity, thereby enabling instant establishment/uphold a communication link between involved transceivers.

In a first possible implementation of the method according to the second aspect, the method also comprises selecting the configuration mode from a set of configuration modes, wherein the configuration mode further comprises a predetermined antenna configuration parameter.

Thereby, the most accurate configuration mode, i.e. predetermined antenna configuration parameter/-s may be switched into.

In a second possible implementation of the method according to the first possible implementation of the second aspect, the method comprises receiving a channel capacity measurement value and selecting the configuration mode from the set of configuration modes, with the highest relative channel capacity with respect to the channel capacity measurement value.

The most accurate configuration mode, i.e. predetermined antenna configuration parameter/-s resulting in the highest relative channel capacity may be switched into.

In a third possible implementation of the method according to the second aspect or any previously presented implementation thereof, the method comprises performing the motorised electromechanical adjustment if previous adjustment was the switching adjustment otherwise perform switching adjustment if previous adjustment was the motorised electromechanical adjustment.

A quick switch into a relatively accurate configuration mode, i.e. predetermined antenna configuration parameter/-s may be made, which may be followed by a fine-tuning to optimal parameter values by motorised electromechanical adjustment. Thereby a combination of speed and optimal channel capacity is reached. Also, such combination of switching and motorised adjustment leads to the possibility of using motors with low performance than in conventional solutions with high power motor, leading to cheaper implementation costs. Also, the size of the motors may be reduced, which is an advantage in particular in portable transceivers, as portability is enhanced.

In a fourth possible implementation of the method according to the second aspect or any previously presented implementation thereof, the method comprises setting the threshold level based on historical antenna configuration parameters.

The setting of the threshold level, and thereby also the selection between switching based adjustment and motorised electromechanical adjustment of the antenna configuration parameter is adapted to statistical use in the communication between the transceivers.

In a fifth possible implementation of the method according to the second aspect or any previously presented implementation thereof, the method also comprises setting the threshold level based on feedback exchanged between at least two transceivers.

Because of the exchange of feedback, an adaptation to current conditions may be made.

In a sixth possible implementation of the method according to the second aspect or any previously presented implementation thereof, the method comprises setting the threshold level based on at least one of a network load and a number of active user equipment.

By setting the threshold level an adaptation of the selection between switching based adjustment and motorised electromechanical adjustment of the antenna configuration parameter is made with the amount of communication in mind, which adapts to altering user population behaviour in a cell.

In a seventh possible implementation of the method according to the second aspect or any previously presented implementation thereof, the latency related measurement value, comprises at least one of a capability parameter, latency requirement, and measurements of channel capacity.

According to a third aspect, a computer program is provided, comprising program code for performing a method according to the second aspect, or any possible implementation of the second aspect, when the computer program runs on a computer.

According to a fourth aspect, a switching unit is provided, configured to receive an antenna configuration parameter; and couple an input receiving data packet based on an antenna configuration parameter to an antenna sub-array for signal transmission.

According to a fifth aspect, a transceiver is provided. The transceiver is configured to receive an antenna configuration parameter; and couple an input receiving data packet based on an antenna configuration parameter to an antenna sub-array for signal transmission.

According to the herein described aspects and implementations, by selecting between switching based adjustment of an antenna configuration parameter when quick adjustments are required and motorised electromechanical adjustment when latency requirements are less strict, it is possible to uphold a communication link between transceivers, also when they are moving with an angular high speed in relation to each other.

The switching into a configuration mode of pre-set antenna configuration parameter/-s may thus be made quick, however possibly not at an optimal channel capacity, thereby enabling instant establishment/uphold a communication link between involved transceivers. Thus, an improved performance within the wireless communication system is provided.

Other objects, advantages and novel features of the aspects of the disclosed solutions will become apparent from the following detailed description.

BRIEF DESCRIPTION OF THE DRAWINGS

Various embodiments are described in more detail with reference to attached drawings in which.

DETAILED DESCRIPTION

Embodiments described herein are defined as a control unit, a method in a control unit, a switching unit and a transceiver, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 2:
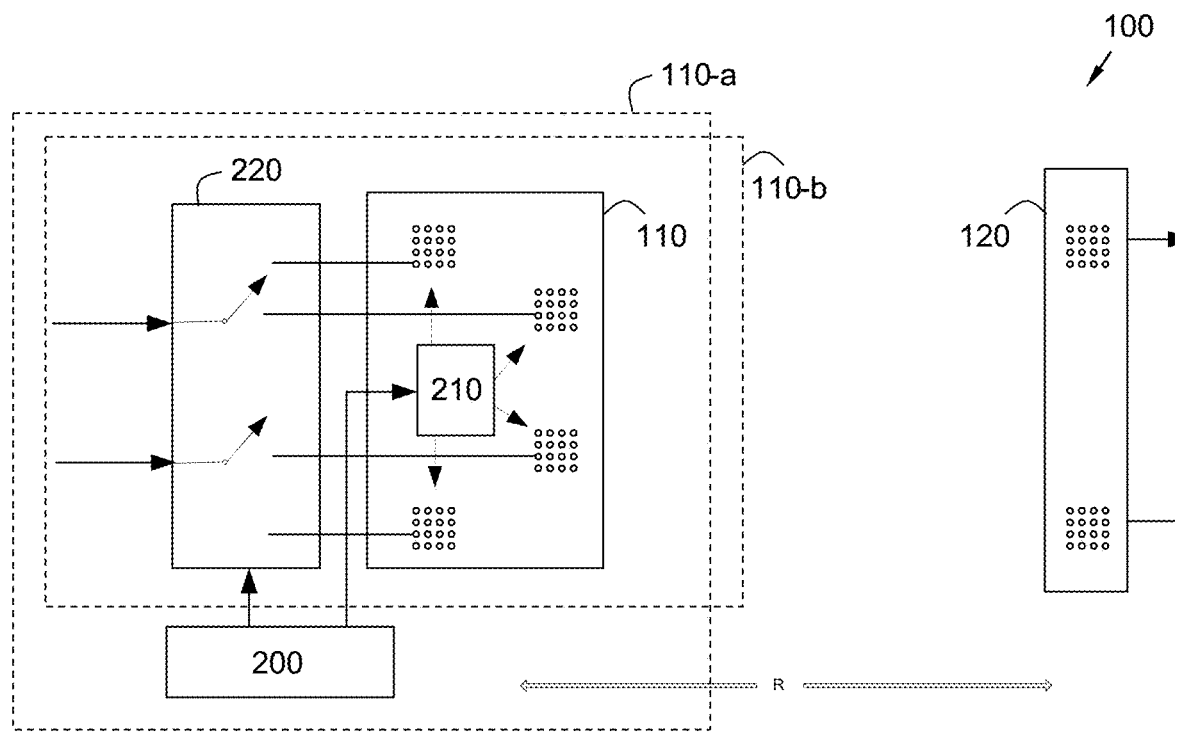
FIG. 2 illustrates a hybrid antenna configuration using switching-based adjustment and motorised adjustment of antenna subarrays of a transceiver.

FIG. 2 is a schematic illustration over a wireless communication system 100 comprising a first transceiver 110 and a second transceiver 120.

In such a system 100, the first transceiver 110 and second transceiver 120 antenna arrays may comprise multiple antenna sub-arrays, configured for beamforming. The sub-arrays are using multiple antenna elements to form narrow beams. Such antenna sub-array may typically have a size similar to the wave length of the transmitted signal.

Figure 1:
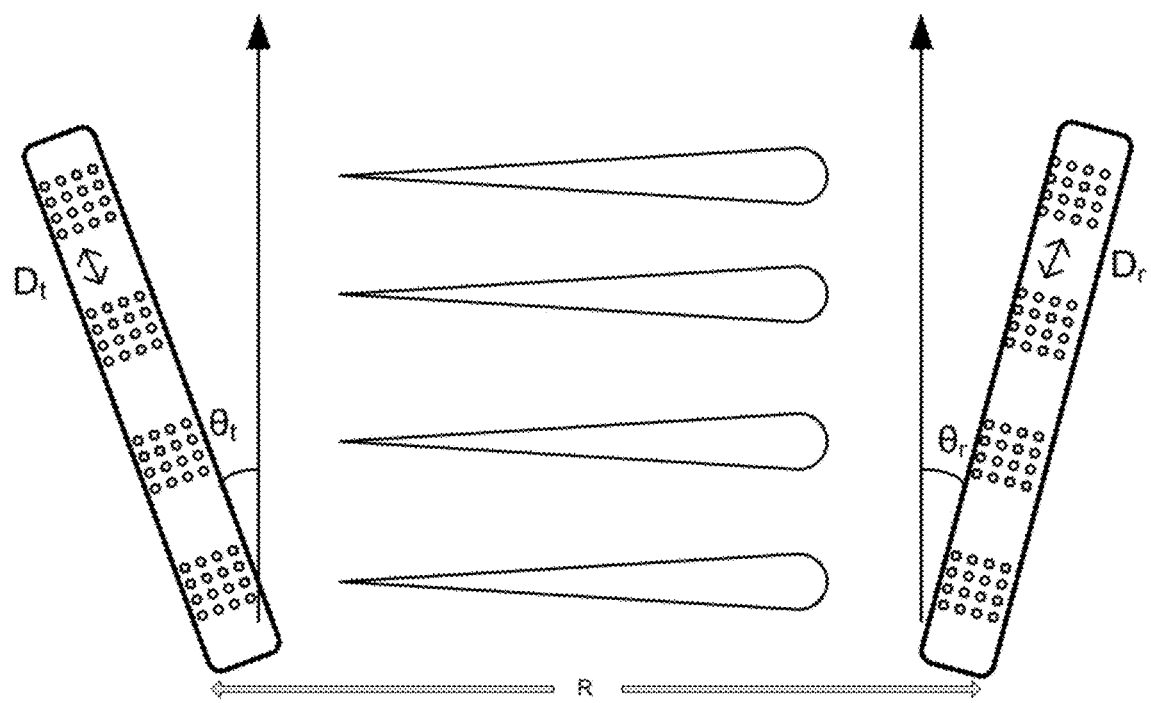
FIG. 1 is an illustration of a transmitter and a receiver according to prior art.

The sub-arrays are using multiple antenna elements to form narrow beams. The inter-subarrays distances are $D_t$ and $D_r$ (see FIG. 1) respectively for the first transceiver 110 and the second transceiver 120. The parameters $\theta_t$ and $\theta_r$ (see FIG. 1) are the down tilting angles for the antenna of the first transceiver 110 and the antenna of the second transceiver 120 respectively.

The transceivers 110, 120 are configured to receive an antenna configuration parameter; and couple an input receiving data packet based on an antenna configuration parameter to an antenna sub-array for signal transmission.

The LoS MIMO channel capacity is the maximum when the following condition is satisfied:

$$D_t D_r = \frac{\lambda R}{V \cos\theta_t \cos\theta_r},$$

where $\lambda$ is the carrier wavelength, R denotes the range between the first transceiver 110 and the second transceiver 120, V=max(M, N) and M, N are the number of sub-arrays at the first transceiver 110 and the second transceiver 120 respectively. In the example previously illustrated in FIG. 1, V=M=N=4. The link capacity may be mostly decided related to down tilt angel $\theta_t$ and $\theta_r$ while azimuth angle has negligible impact on the channel capacity. Above channel capacity maximisation condition is applicable for 3D antenna deployment as well as 2D deployment depicted in FIG. 1.

The antenna elements of the first transceiver 110 and the second transceiver 120 may be mounted on position adjustable rods or wires and the position adjustable rods or wires being electromechanically adjustable. Thereby, e.g. the design parameters $D_t$ and $D_r$ can be configured at the first transceiver 110 and/or the second transceiver 120 such that the capacity of transmission channel between the first transceiver 110 and the second transceiver 120 is optimised.

A control unit 200 may be co-located with the first transceiver 110a in some embodiments. However, the control unit 200 may in other embodiments be separate from the first transceiver 110b.

The control unit 200 may also determine the antenna configuration parameters, such as inter-subarrays distances $D_t$, inter transceiver distance R, down tilting angle $\theta_t$, in order for establishing/upholding the radio link between the transceivers 110, 120. Inter transceiver distance R can be determined through predefined deployment information or through measurements via any types of range finder equipment/methods. These are determined based on relative movements between the transceivers 110, 120 if any or both of the transceivers are moving. In case both transceivers 110, 120 are static and there is LoS, the antenna configuration parameters may not be changed. However, for static transceivers 110, 120, the parameters still may change if the surrounding environment is changing.

When the antenna configuration parameters $D_t$, R, $\theta_t$, in order to establish/uphold a communication link between the transceivers 110, 120 have been decided, the control unit 200 determines to change the antenna configuration parameters $D_t$, R, $\theta_t$, either by selecting motorised electromechanical adjustment of the antenna configuration parameters $D_t$, R, $\theta_t$, realised by a motor 210 in the transceiver 110, or selecting a switching based adjustment, realised by a switching unit 220 in the transceiver 110. Methods applied by the control unit 200 can be applied on the transceiver 120 in the same manner if the transceiver 120 has the same capabilities for switching based adjustment and motorised electromechanical adjustment.

The switching unit 220 may be configured to receive an antenna configuration parameter; and couple an input receiving data packet based on an antenna configuration parameter to an antenna sub-array for signal transmission.

The switching based sub-array configuration/reconfiguration, compared with the mechanical tuning based method, can react faster if the control signalling is available, which makes it suitable for faster configuration of transceiver antenna in a more rapidly changing communication scenarios. Thereby, the capacity of the channel between the transceivers 110, 120 can be improved or even pushed to its maximum value, which hence enables to support higher/highest data rate for the communication between the transceivers 110, 120, in some embodiments.

The decision between switching based adjustment and motorised electromechanical adjustment is made based on e.g. node capability and latency requirement of the involved transceivers 110, 120, and a comparison is made with a threshold limit. The threshold limit may e.g. be set to the time period it is estimated to take to adjust the antenna configuration parameters $D_t$, R, $\theta_t$ by motorised electromechanical adjustment with the motor 210.

An example: in case e.g., the second transceiver 120 requires a transmission from the first transceiver 110 within a time period which is shorter than the threshold limit, switching based adjustment is selected. Otherwise, when the next transmission may wait for a time period exceeding the threshold limit, motorised electromechanical adjustment with the motor 210 may be selected. These concepts of adjusting the antenna configuration parameters $D_t$, R, $\theta_t$, may also be combined in some embodiments, as will be described more in detail in FIG. 6 and the corresponding part of the disclosure.

According to the signalling, the configuration of the antenna elements is adjusted as determined by the control unit 200. The adjustment may be done for each sub-array which may comprise multiple antenna elements. The adjustment may be done on sub-array level in some embodiments, where every antenna elements within one sub-array is configured together.

The objective is to select between motorised electromechanical adjustment and switching based adjustment of antenna elements', based on operation scenarios and latency requirements of the communication between the transceivers 110, 120, to best suit the communication scenarios. When the communication is latency limited and the system 100 needs to react rapidly, the switching based adjustment is chosen and when the communication has a relaxed latency constraint, motorised electromechanical adjustment is chosen to achieve the optimal channel capacity between the transceivers 110, 120.

The transceivers 110, 120 make their capability known to the control unit 200 and the control unit 200 makes the selection between motorised electromechanical adjustment and switching based adjustment, based on the capability of the transceivers 110, 120 involved in the communication, and operation scenarios. Also, control signalling is generated and transmitted to at least one of the transceivers 110, 120 to either fast-switch antenna elements connection or slow-adjust antenna elements positions to best configure the communication link under operation constrains.

The transceivers 110, 120 may be two backhaul nodes in some embodiments. In other embodiments, one of the transceivers 110, 120 may be an access node and the other one may be a backhaul node. In yet some embodiments, one of the transceivers 110, 120 may be an access node and the other one may be a mobile device/user equipment.

The communication may be made using millimetre wave radio with wavelength between 1 mm and 10 mm, corresponding to frequencies from 30 GHz to 300 GHz in some embodiments. This is in particular valuable, due to the non-omni radiant nature of millimetre wave radio, which rather behave like an invisible light beam transmitted from an emitter to a photocell as discussed in the background section. However, the herein described solution is by no means limited to millimetre wave radio, but may be applied within any subset of the radio spectrum; or for any electromagnetic radiation.

Figure 8:
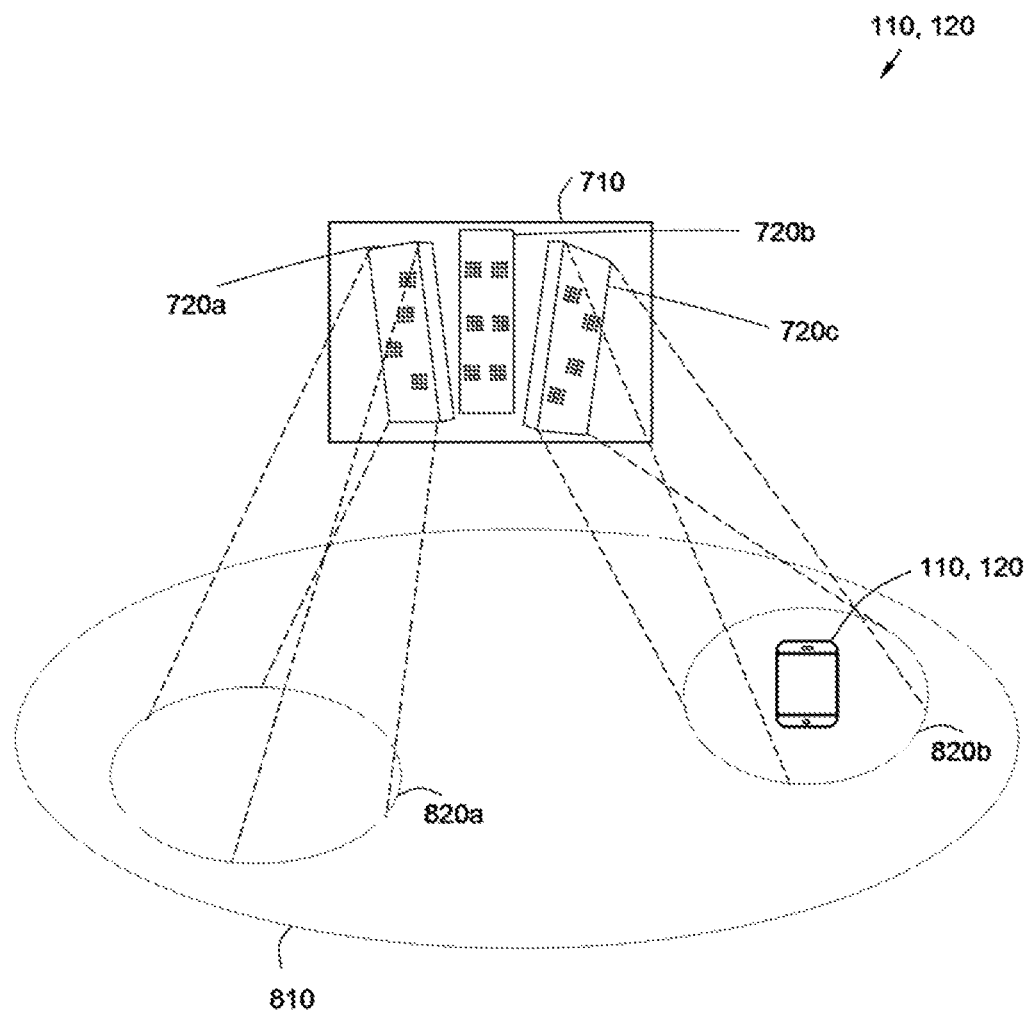
FIG. 8 is a block diagram illustrating switching-based adjustment and panel-based electromechanical motor configuration of the antenna array with multiple antenna panels to serve hot-spots and a macro cell according to an embodiment.

An example of an application may be (MIMO) beamforming within the "normal" radio spectrum; and/or for creating a virtual hotspot, i.e. micro-/pico-/femtocell within a (macro) cell, thereby boosting local capacity as illustrated in FIG. 8 and further discussed in the corresponding section of the disclosure.

The wireless communication system 100, and the therein comprised communication devices 110, 120 may be based on millimetre wave radio, communicating on a frequency approximately between 30 GHz and 300 GHz, in some embodiments. However, in other embodiments, the wireless communication system 100 may be based on other radio access technologies such as, e.g., 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilised interchangeably.

The first transceiver 110 and/or the second transceiver 120 may be comprised in backhaul nodes in some embodiments. In other embodiments, one node of the first transceiver 110 and the second transceiver 120 may be an access node while the other node is a backhaul node. In yet some embodiments, one of the first transceiver 110 and/or the second transceiver 120 may be comprised in an access node and the other node is comprised in a user equipment.

Both of the first transceiver 110 and the second transceiver 120 may have multiple antennas in an antenna array, configured for beamforming the respective antenna beam. Such antenna typically may have length similar to the wave length of the transmitted signal. In millimetre radio, an appropriate antenna length may be e.g. 1-10 mm, or corresponding with the wave length. Thus, also a transceiver 110, 120 of small size may comprise multiple antennas without affecting portability. Further, the first transceiver 110 and/or the second transceiver 120 may be configured for forming multiple beams in different directions in some embodiments.

Also, in some embodiments, both the first transceiver 110 and the second transceiver 120 may be mobile devices e.g. in an ad-hoc network; or e.g. a mobile relay node or micro node on the roof of a vehicle such as a train or a bus, forming a backhaul link with a macro node.

The concept of switching antenna configuration parameters between different pre-set configuration modes may be in particular advantageous in the communication between an aggregation backhaul node communicating with multiple backhaul nodes; or otherwise where one node communicates with a plurality of other nodes.

Figure 3:
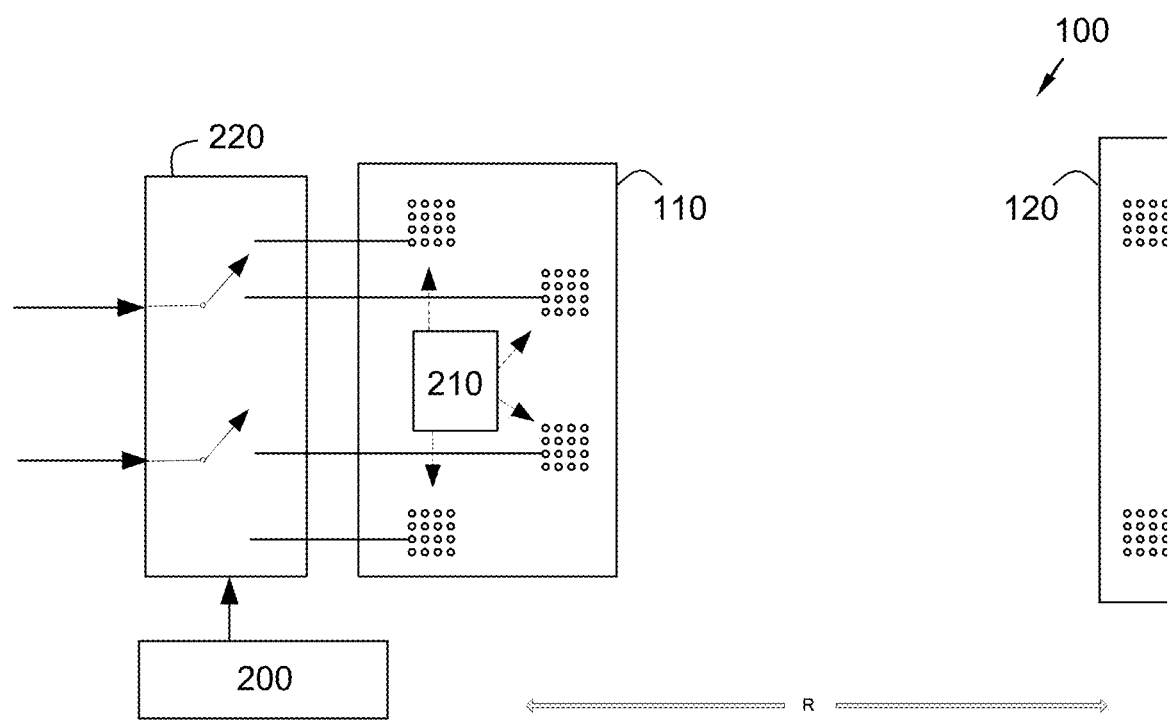
FIG. 3 is an illustration of switching-based adjustment of antenna sub-arrays of a transceiver.

FIG. 3 shows that the adjustment of sub-arrays of the transceiver 110, 120 may be done through switching, i.e., by changing the connection between the input signals to the antenna sub-arrays, such that different antenna configurations, or configuration modes, with pre-set parameters $D_t$, $D_r$, $\theta_t$ and $\theta_r$ can be resulted to enhance or optimise the capacity of channel between the transceivers 110, 120. In the depicted non-limiting example, there is four antenna sub-arrays and there are two data streams to be received by two receive sub-arrays at the second transceiver 120. In the disclosed solution, the control unit 200 generate and send control signals, which based on various types of signalling as will be outlined in below configures the connection of the streams to the sub-arrays. The disclosed solution can be applied to various types of arrays comprising e.g. cylindrical arrays or any 3D antenna array. Note that the data streams prior to the switching unit 220 may be digitally beamformed and passed through radio frequency chains. Further analogue beamforming after the radio frequency chain may also be possible in some embodiments.

Figure 4:
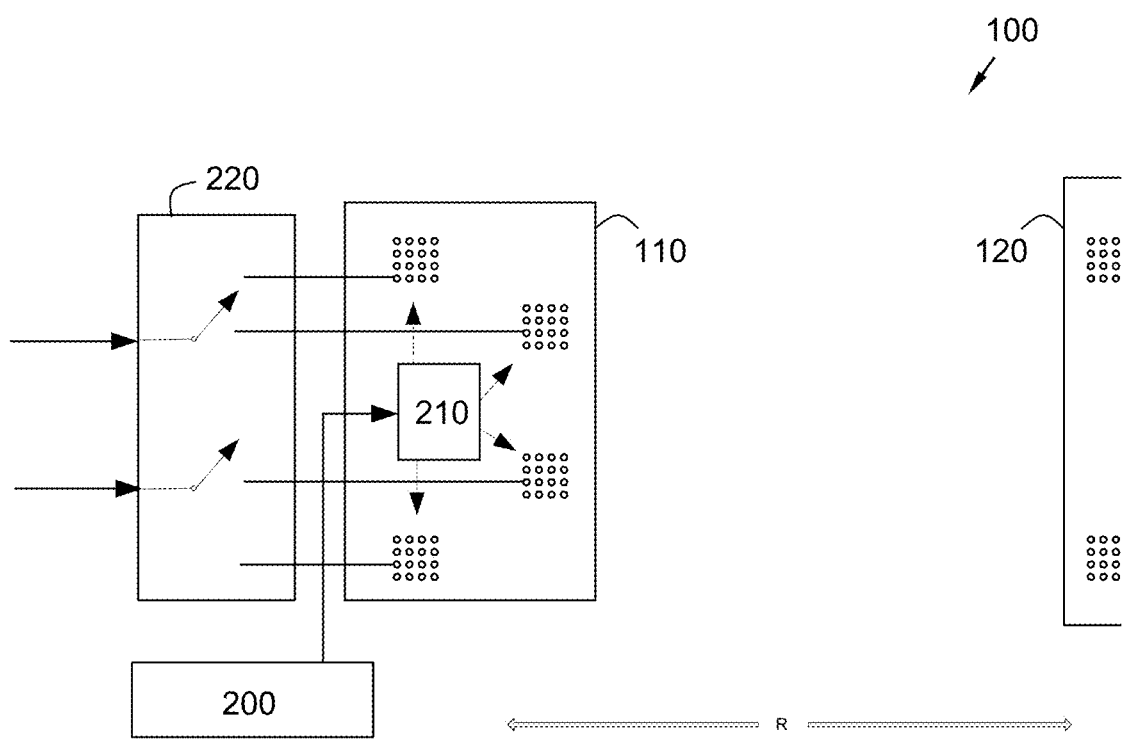
FIG. 4 is a block diagram illustrating motorised adjustment of antenna sub-arrays of a transceiver.

FIG. 4 shows that the adjustment of sub-arrays can be also done only through motorised electromechanical adjustment of sub-array positions. In one exemplary implementation, sub-arrays can be mounted onto a base structure which can be moved/rotated by a motor such that antenna configurations parameters $D_t$, $D_r$, $\theta_t$ and $\theta_r$ can be finetuned with high precision.

For example, a switching based adjustment of $\theta_t$ and $\theta_r$ can be done with step of 10 or 20 degrees while for motorised adjustment $\theta_t$ and $\theta_r$ can be done with step of 1 or 2 degrees.

Figure 5A:
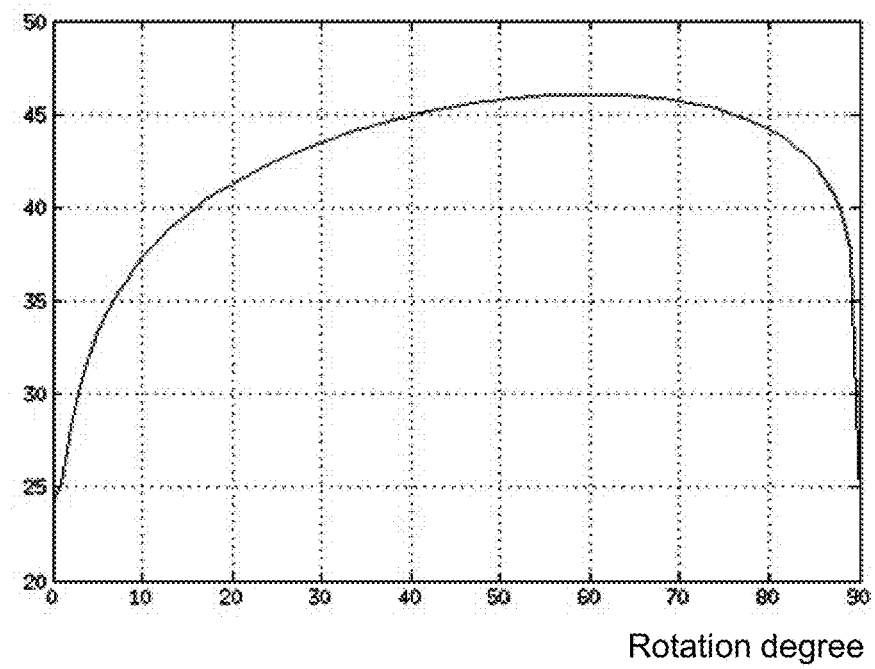
FIG. 5A is a diagram illustrating effects of changing down tilting angle on channel capacity.

An example illustrating the effect on the channel capacity of changing antenna down tilting angle, i.e. $\theta_t$ and $\theta_r$ is shown in FIG. 5A. As shown in below, for a wide-angle range, for example from about 20 degree to about 85 degrees, the channel capacity is sub-optimal and within about 90% of the optimal value, i.e. the peak value in FIG. 5A. However, there is a severe capacity loss for angles 0 and 90 degrees. Therefore, this issue may be solved by the solution of antenna tilting angles to stay close to optimal and to avoid the capacity loss for antenna system with a fixed configuration. However, it is seen that there is a tilting angle that provides maximum capacity and this angle may change in different communications setup for example depending on the range of communication or frequency band over which the communications is scheduled. It may be noted that in millimetre wave radio signalling, there is a wide band of frequencies over which the antenna configuration may be adjusted depending on the scheduled frequency band.

Figure 5B:
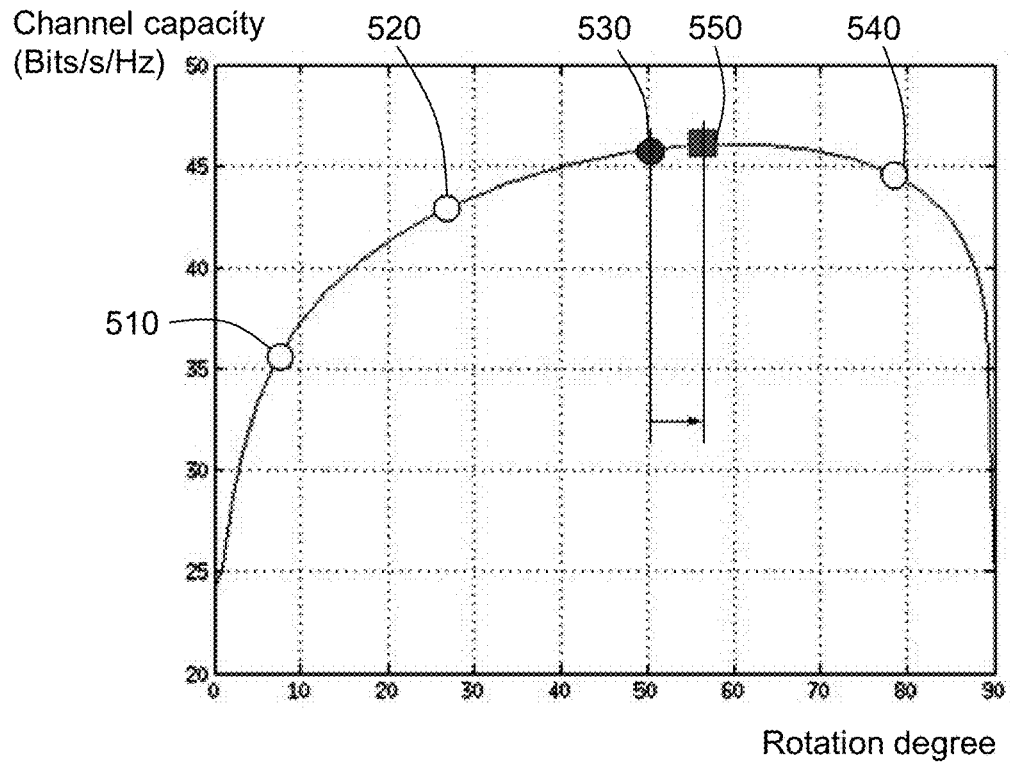
FIG. 5B is a diagram illustrating effects of changing down tilting angle on channel capacity and four switching modes.

FIG. 5B illustrates how the disclosed solution may operate for the given exemplary communication scenario in FIG. 5A in an embodiment. As illustrated, there are four discrete pre-set configuration modes 510, 520, 530, 540, i.e. in this non-limiting example. In this case, the pre-set configuration modes 510, 520, 530, 540 comprises antenna down tilting angle, i.e. $\theta_t$ and $\theta_r$ of the first transceiver 110 and/or the second transceiver 120. However, in other embodiments, other parameters may be pre-set in the configuration modes 510, 520, 530, 540, as previously mentioned.

In the illustrated non-limiting example, pre-set configuration modes 510, 520, 530, 540 the antenna down tilting angle $\theta_t$ are pre-set approximately to 8 degrees, 27 degrees, 51 degrees and 78 degrees.

The control unit 200 firstly determines to change the antenna down tilting angle $\theta_t$ of the first transceiver 110 by switching based adjustment. Then, one configuration mode 530, out of the set of four available configuration modes 510, 520, 530, 540 is selected, which provides the highest channel capacity.

Further adjustments may then be made by motorised electromechanical adjustment fine tuning of the antenna down tilting angle $\theta_t$ by the motor 210 to configure the antenna array toward its peak capacity 550 as illustrated in the FIG. 5B. Thus, some few degrees of mechanical rotation may be enough to configure the antenna toward its optimal rotation angle according to the disclosed hybrid method, when starting from a pre-set configuration. This also furnishes the usage of cheaper electromechanical and potentially more compact motors with limited rotations along an axis enabled by initial coarse tuning using the switching based adjustment.

In practical networks, by using a number of pre-set configuration modes 510, 520, 530, 540 which may be selected by switching, a number of antenna subarrays configurations are able to achieve a close-to-optimal to optimal channel capacity, depending on how the antenna tilting angles are adjusted.

By switching the connection to the antenna sub-array of the transceiver 110, large step adjustment of antenna tilting may be achieved hence sub-optimal channel capacity can be obtained. This type of adjustment may be very useful when quick adjustment is needed for scenarios such as one node changes its connection towards multiple other nodes. One specific scenario, may be that LoS MIMO connection is used between the transceivers 110, 120, e.g. when at least one of the transceivers 110, 120 is a mobile node. When the mobile node is moving in relation to the other node, fast adjustment may be needed to maintain high capacity connection between the mobile node and the other node.

When the connection scenario has a less latency constraint such as when the transceivers 110, 120 comprises two fixed nodes, or the connection is for initial deployment where a long latency is allowed, a small step adjustment of the antenna tilting angle can be used to achieve optimal/peak channel capacity. When the antenna sub-array is mounted on physical structures, the physical position of those structures can be adjusted through use of electromechanical means such as the electromechanical motor 210.

Small size, low performance motors 210 may be used in some embodiments, which may be used to adjust and reconfigure antenna sub-arrays to bring additional capacity gains while reducing costs of the wireless communication system 100.

In the disclosed solution, the control unit 200 thus collects information about the network environment, deployment scenario and user equipment mobility etc., and makes decision on whether fast or slow antenna configuration is to be used, or possibly a combination thereof.

Fast configuration and slow configuration can be combined that the fast "switching" type configuration is used to achieve coarse tuning and motorised configuration is used to achieve fine-tuning.

Figure 6:
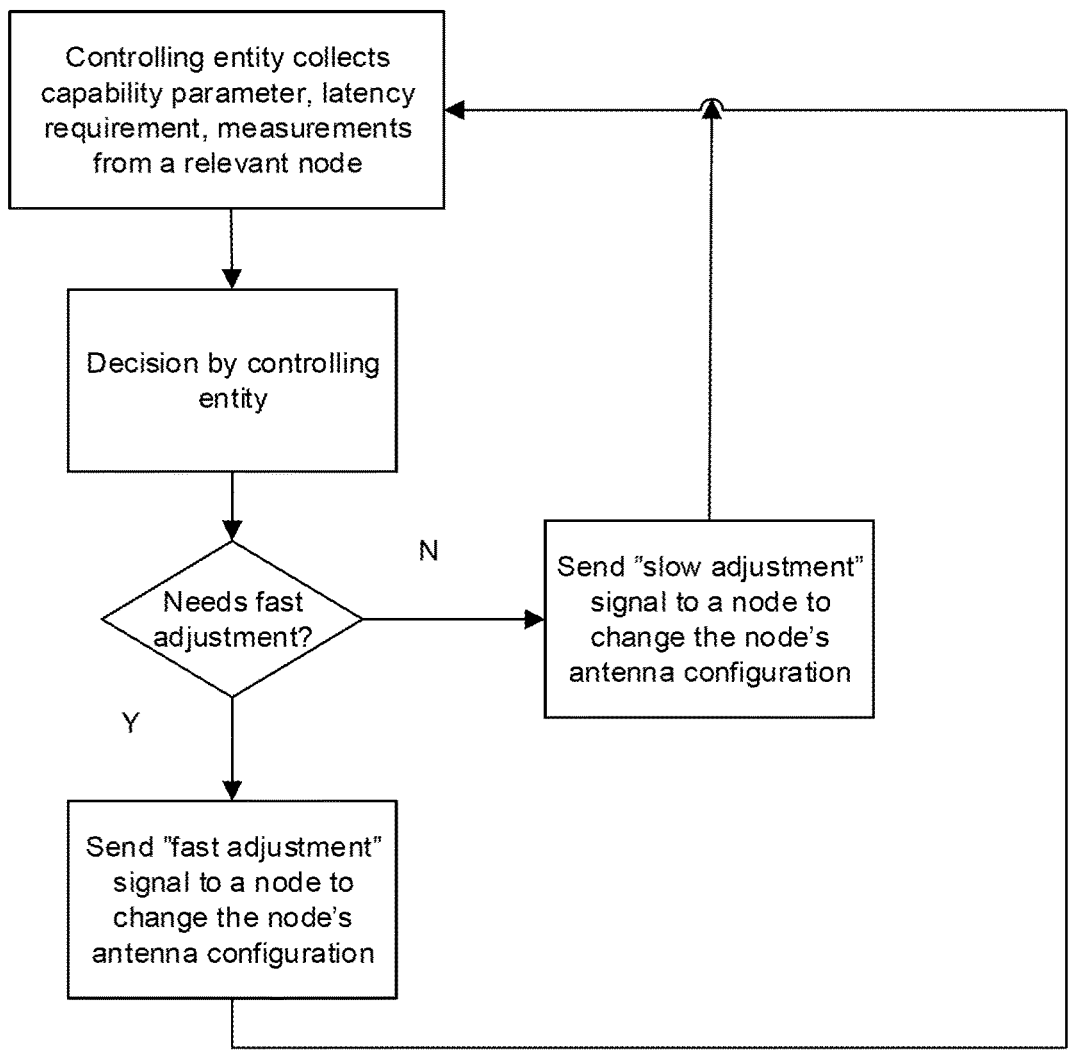
FIG. 6 is a flow chart illustrating a method for controlling selection of adjustment concept according to an embodiment.

FIG. 6 shows the controlling flow to be employed by the control unit 200 to configure the antenna array of the transceiver 110, according to an embodiment.

The controlling signalling is decided by the control unit 200. The control unit 200 collects capability parameters, latency requirements and other possible measurements from relevant nodes such as the first transceiver 110 and/or second transceiver 120. Such measurements may be direct or indirect measurements of the channel capacity. The indirect measurements of the capacity may include different parameters such as Signal-to-Noise Ratio (SNR), Signal-to-Interference-plus-Noise Ratio (SINR), Signal-to-Interference Ratio (SIR), or other similar ratio that compares the level of a desired signal to the level of background noise and interference; rank of the channel, range of the communications, carrier frequency et cetera. This measurement may be done by the first transceiver 110 and/or the second transceiver 120 and then forwarded to the control unit 200. The measurement results may be sent from one node to another node where the node can be the first transceiver 110, the second transceiver 120 and/or the control unit 200 in some embodiments.

The signalling by the control unit 200 can be used to select between fast or slow adjustment. For example, the control unit 200 can directly request the first transceiver 110 and/or the second transceiver 120 to use fast or slow adjustment method through a binary signalling "0"/"1", in some embodiments. Thus "0" may indicate for the relevant transceiver 110, 120 that switching based adjustment is to be used for adjusting the antenna configuration parameter/-s, and "1" may indicate that motorised electromechanical adjustment is to be used, or vice versa in different embodiments. An advantage therewith is that a minimum of control signalling is required.

In some alternative embodiments, the control unit 200 may indicate a time constraint in which the adjustment of the antenna configuration parameter has to be finished and let the other transceiver 110, 120 choose which adjustment method to use, based on the other transceiver's 110, 120 knowledge of its own antenna array status and adjustment capability.

In some further embodiments, the herein disclosed solution may be used in frequency band that is lower than the millimetre wave band, such as for example 10 GHz or 6 GHz band. The resulting antenna size or the size of physical entity containing the antenna may be bigger than that for the case of millimetre wave band, however the disclosed method may be applied with the same principles.

In some embodiments, the signalling and the adjustment may be implemented for each antenna element even within one antenna sub-array. Further, the antenna element's physical connection and physical position can be switched or adjusted in the same way as for the adjustment of the antenna sub-array of the transceiver 110, 120. Above alternative embodiments may be combined to achieve best results, depending on communication environment and performance-cost trade off.

Figure 7:
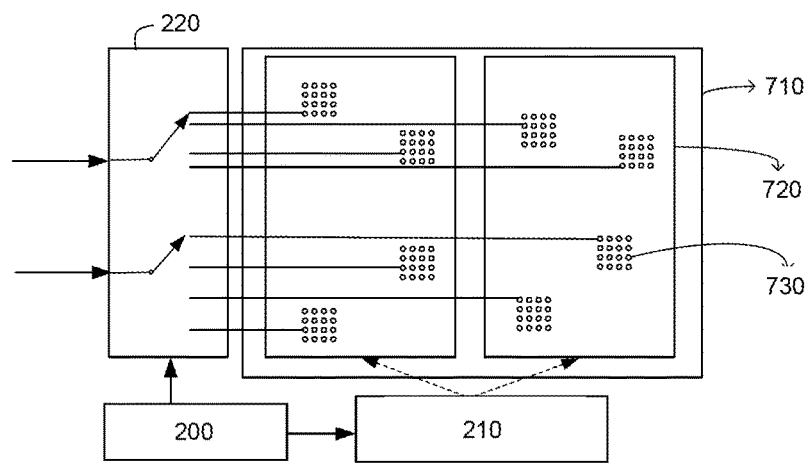
FIG. 7 is a block diagram illustrating switching-based adjustment and panel-based electromechanical motor configuration of an antenna array with multiple antenna panels according to an embodiment.

The antenna array adjustment may be done in the following manner in some embodiments, wherein the antenna array 710 compromises multiple antenna panels 720 where each antenna panel 720 contains multiple antenna sub-arrays 730 as illustrated in FIG. 7.

The switching unit 220, based on the signalling, may connect the incoming signals to the antenna elements in the sub-array 730. In this way, a fast antenna configuration is performed. To further adjust the antenna configuration, through further signalling, using the electromechanically motors 210, the antenna panels 720 may be adjusted to boost the capacity by enhancing the link budget toward the intended receiver, i.e., the second transceiver 120. The order of fast and slow configuration may change depending on the scenarios. In particular, the antenna panel 720 can be used to virtually sectorise the cells such that the cells can be divided into multiple sectors for which interference may be controlled, or kept below a threshold.

In yet an alternative embodiment, the antenna array 710 with electromechanically steerable panels 720a, 720b, 720c can be used to provide coverage for hot spots 820a, 820b or to create virtual cells within a macro cell 810. With the help of electromechanical motors 210, the panels 720a, 720b, 720c may be configured or reconfigured to maximise the capacity for hot spots 820a, 820b. The configuration may be done based on historical traffic load over relevant geographical area, in some embodiments.

The electromechanical configuration of the antenna panels 720a, 720b, 720c can be done slowly based on a map of the (measured, historical or estimated) traffic load and its variation over the time as well as over geographical areas. Each antenna panel 720a, 720b, 720c may comprise multiple reconfigurable sub-arrays 730, enabled by the switching unit 220, which can be used to maximise the capacity for each user equipment served by a specific antenna panel 720a, 720b, 720c. The selection of sub-array modes within each antenna panel 720a, 720b, 720c may be done much faster because of the switching unit 220 and hence can be combined by user scheduling in the system 100.

FIG. 8 shows an antenna array with three electromechanically steerable antenna panels 720a, 720b, 720c where each panel 720a, 720b, 720c comprises multiple sub-arrays 730 with a switching unit 220. In the shown FIG. 8, there is a user equipment shown in one hot-spot 820b, where the transceiver 110 may be configured by the control unit 200 for the most suitable sub-array mode configuration, using the switching unit 220 to serve the user equipment 10 the hot-spot 820b.

Thus, in some embodiments, a first panel 720a may be adjusted for creating a first hotspot 820a, a second panel 720b may be adjusted for serving the macro cell 810 and the third panel 720c may be adjusted for creating a second hotspot 820b, at certain moments in time when the traffic/concentration of user equipment may be predicted to be high.

The hotspots 820a, 820b may be e.g. offices during office hours, restaurants during lunch hours/dinner time; etc. By redirecting panels 720a, 720b, 720c of the transceiver 110 in this manner, in particular when the transceiver 110 is comprised in an access node, transceiver capacity of the cell 810 may be adapted to user population changes over time within the cell 810, leading to better resource utilisation, higher capacity within the cell 810 and enhanced user performance. The time schedule for redirecting the panels 720a, 720b, 720c may be based on historical user population in the cell 810; on real time tracking of user equipment in the cell 810, on estimations of user population in the cell 810, etc.

Thereby, by intelligently choosing between switching based configuration/reconfiguration of sub-arrays 730 of the transceiver 110, 120; and mechanically motorised tuning, the capacity of the channel between the transceivers 110, 120 can be improved either quickly yet to a sub-optimal level, or pushed to its maximum value yet with latency.

In such way, the communication link can be optimised according to operation conditions such as initial deployment or run-time operation in more rapidly changing communication scenarios.

In some embodiments, motorised electromechanical adjustment of the antenna configuration parameter may be made firstly by the motor 210 during a low traffic period, where after a switching based adjustment based on a configuration mode 510, 520, 530, 540 may be made. The situation may also be the opposite, as already discussed and illustrated in FIG. 5B.

Figure 9:
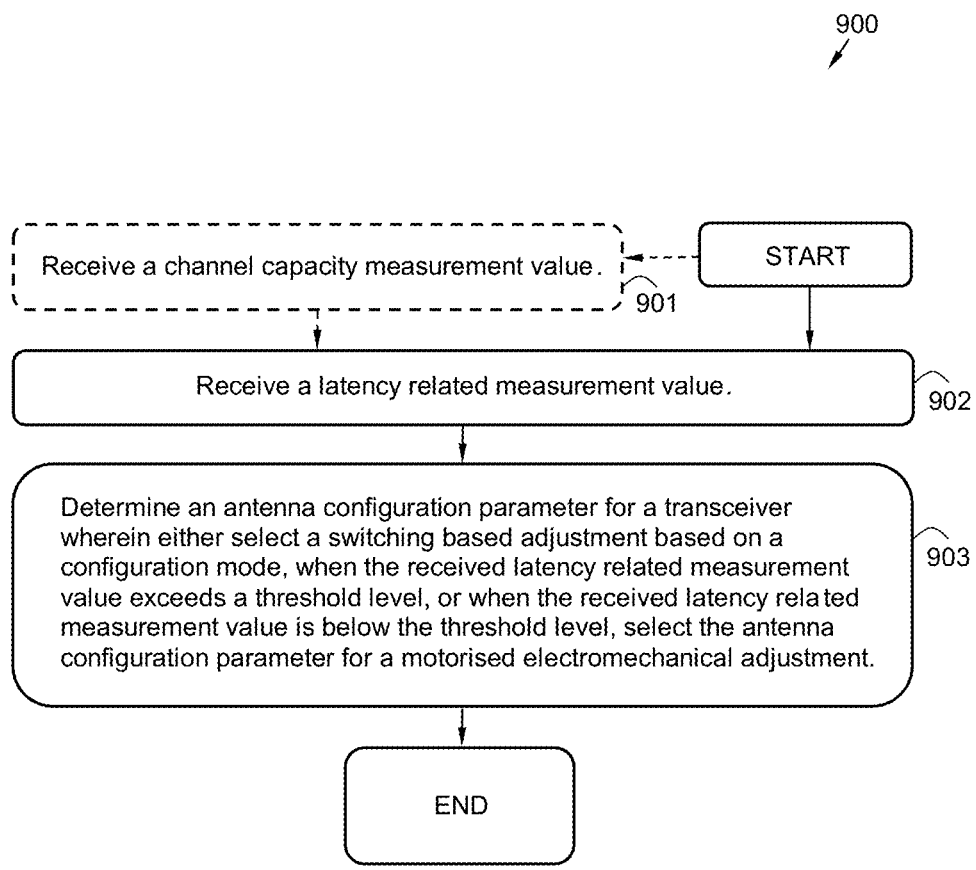
FIG. 9 is a flow chart illustrating a method in a transceiver according to an embodiment.

FIG. 9 illustrates an example of a method 900 according to an embodiment. The flow chart in FIG. 9 shows the method 900 executed in a control unit 200 for selecting between switching based adjustment and motorised electromechanical adjustment when adjusting at least one antenna configuration parameter of a first transceiver 110. The antenna configuration parameter may comprise e.g. an inter-subarrays distance $D_r$, down tilting angle for transmit antenna $\theta_r$, and/or distance R between the communicating first transceiver 110 and a second transceiver 120.

In order to correctly adjust the antenna configuration parameter, the method 900 may comprise a number of steps 901-903. However, some of these steps 901-903 may be performed solely in some alternative embodiments, like e.g. steps 901. Further, the described steps 901-903 may be performed in a somewhat different chronological order than the numbering suggests. The method 900 may comprise the subsequent steps:

Step 901 which only may be comprised in some embodiments, comprises receiving a channel capacity measurement value.

The channel capacity measurement value may be measured by the first transceiver 110 and may be received from the first transceiver 110 and may comprise e.g. throughput, spectral efficiency, or some measurement of noise contamination of the communication channel like SINR, SIR, SNR, etc.

Step 902 comprises receiving a latency related measurement value.

The latency related measurement value may comprise capability parameters, latency requirement of the adjustment, and direct or indirect measurements of the channel capacity in different embodiments.

In some embodiments, the latency related measurement value may be the time requirement of the communication between the transceivers 110, 120.

However, in other embodiments, when the first transceiver 110 is an access node, the latency related measurement value may be related to an expected, predicted or scheduled amount of transmission to/from user equipment within a cell served by the first transceiver 110.

Step 903 comprises determining an antenna configuration parameter for the transceiver 110 wherein either select a switching based adjustment based on a configuration mode 510, 520, 530, 540 when the received 902 latency related measurement value exceeds a threshold level, or when the received 902 latency related measurement value is below the threshold level, select the antenna configuration parameter for a motorised electromechanical adjustment.

Thereby, the threshold level may be set so that the switching based adjustment is selected when a quick adjustment of the antenna configuration parameter is required, and the motorised electromechanical adjustment is selected when a less quick adjustment may be tolerated, i.e. latency requirements are less strict.

In some embodiments, the threshold limit may be set, based on historical antenna configuration parameters. In some embodiments, the threshold level may be based on feedback exchanged between at least two transceivers 110, 120.

The threshold limit may e.g. be set to the time period it is estimated to take to adjust the antenna configuration parameters $D_t$, R, $\theta_t$, by motorised electromechanical adjustment with a motor 210 of the transceiver 110.

The threshold level may in some embodiments be set, based on at least one of a network load and a number of active user equipment in the cell served by the transceiver 110, when comprised in an access node.

In some embodiments, the antenna configuration parameter may be determined by selecting the configuration mode 510, 520, 530, 540 from a set of configuration modes, wherein the configuration mode 510, 520, 530, 540 further comprises a predetermined antenna configuration parameter.

The antenna configuration parameter may be determined by performing the motorised electromechanical adjustment if previous adjustment was the switching adjustment otherwise perform switching adjustment if previous adjustment was the motorised electromechanical adjustment.

The antenna configuration parameter may be determined by selecting the configuration mode 510, 520, 530, 540 from the set of configuration modes, with the highest relative channel capacity with respect to the channel capacity measurement value, in some embodiments.

Figure 10:
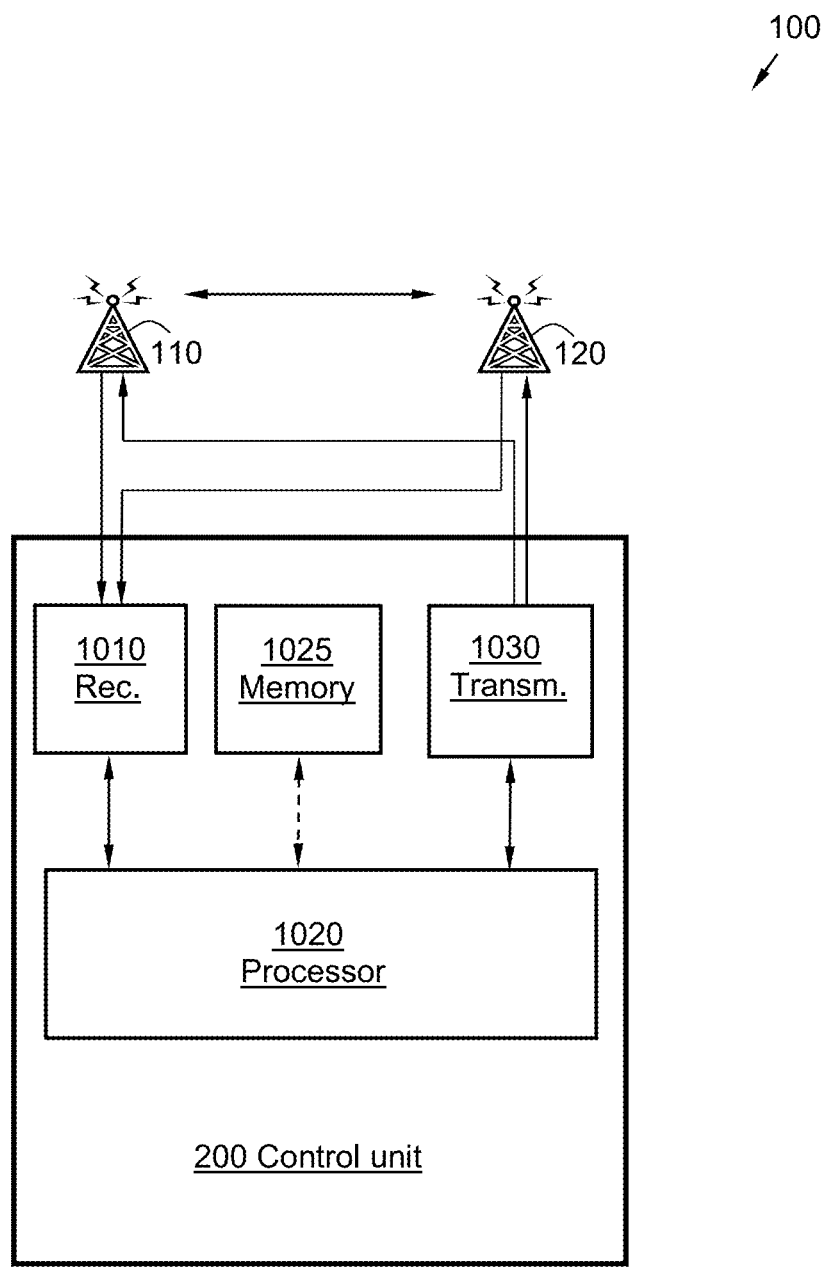
FIG. 10 is a block diagram illustrating a first communication device according to an embodiment.

FIG. 10 illustrates an embodiment of a system 100 for selecting adjustment concept between switching based adjustment and motorised electromechanical adjustment.

The system 100 comprises a control unit 200. The control unit 200 is configured to perform at least some of the previously described method steps 901-903 according to the method 900 described above and illustrated in FIG. 9. The control unit 200 is thereby configured to select a switching based adjustment based on a configuration mode 510, 520, 530, 540, when the received latency related measurement value exceeds a threshold level, or select motorised electromechanical adjustment when the received latency related measurement value is below the threshold level. The latency related measurement value, may comprise at least one of a capability parameter, latency requirement, and measurements of channel capacity.

The control unit 200 is configured to receive a latency related measurement value. The latency related measurement value may comprise at least one of a capability parameter, latency requirement, and measurements of channel capacity.

Further, the control unit 200 is in addition configured to determine an antenna configuration parameter for a transceiver 110, wherein either select a switching based adjustment based on a configuration mode 510, 520, 530, 540, when the received latency related measurement value exceeds a threshold level, or when the received latency related measurement value is below the threshold level, select the antenna configuration parameter for a motorised electromechanical adjustment. Also, the control unit 200 is configured to select the configuration mode 510, 520, 530, 540 from a set of configuration modes, wherein the configuration mode 510, 520, 530, 540 further comprises a predetermined antenna configuration parameter.

The control unit 200 is in some embodiments configured to receive a channel capacity measurement value and select the configuration mode 510, 520, 530, 540 from the set of configuration modes, with the highest relative channel capacity with respect to the channel capacity measurement value.

The control unit 200 is in some embodiments configured to perform the motorised electromechanical adjustment if previous adjustment was the switching adjustment otherwise perform switching adjustment if previous adjustment was the motorised electromechanical adjustment.

Furthermore, the control unit 200 may also be configured to set the threshold level based on historical antenna configuration parameters. The control unit 200 may furthermore be configured to set the threshold level based on feedback exchanged between at least two transceivers 110, 120 in some embodiments. Also, the control unit 200 may be configured to set the threshold level based on at least one of a network load and a number of active user equipment.

The control unit 200 may comprise a receiver 1010 configured to receive information from the transceiver 110, 120.

The control unit 200 also may comprise a processing circuit 1020 configured to perform various calculations for conducting the method 900 according to at least some of the previously described steps 901-903.

Such processing circuit 1020 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 200 may comprise a memory 1025 in some embodiments. The optional memory 1025 may comprise a physical device utilised to store data or programs, i.e., sequences of instructions, on a temporary or permanent basis. According to some embodiments, the memory 1025 may comprise integrated circuits comprising silicon-based transistors. The memory 1025 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 200 may comprise a signal transmitter 1030. The signal transmitter 1030 may be configured to transmit signals via a wired or wireless communication interface to the transceivers 110, 120.

However, in some alternative embodiments, the system 100 may comprise additional units for performing the method 900 according to steps 901-903, like the switching unit 220, the motor 210, and the transceivers 110, 120.

The above described steps 901-903 to be performed in the control unit 200 may be implemented through the one or more processing circuits 1020 within the control unit 200, together with a computer program for performing at least some of the functions of the steps 901-903. Thus, the computer program comprises instructions which, when the computer program is executed by the control unit 200 in the system 100, cause the control unit 200 to carry out the method 900 according to at least some of steps 901-903.

The computer program mentioned above may be provided for instance in the form of a computer-readable medium, i.e. a data carrier carrying computer program code for performing at least some of the steps 901-903 according to some embodiments when being loaded into the one or more processing circuits 1020 of the control unit 200. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 200 remotely, e.g. over an Internet or an intranet connection.

The terminology used in the description of the embodiments as illustrated in the accompanying drawings is not intended to be limiting of the described method 900; the control unit 200; the computer program; the system 100, the switching unit 220, the transceivers 110, 120 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A control unit comprising a receiver and a processor, wherein
   the receiver is configured to cooperate with the processor to receive a latency related measurement value; and
   the processor is configured to determine an antenna configuration parameter for a transceiver, including:
      selecting a switching based adjustment based on a configuration mode, when the received latency related measurement value exceeds a threshold level, or
      when the received latency related measurement value is below the threshold level, selecting the antenna configuration parameter for a motorised electromechanical adjustment.

2. The control unit according to claim 1, wherein the processor is further configured to select the configuration mode from a set of configuration modes, wherein the configuration mode further comprises a predetermined antenna configuration parameter.

3. The control unit according to claim 2, wherein the receiver is further configured to cooperate with the processor to receive a channel capacity measurement value, and the processor is configured to select the configuration mode from the set of configuration modes, with a highest relative channel capacity with respect to the channel capacity measurement value.

4. The control unit according to claim 1, wherein the processor is further configured to perform the motorised electromechanical adjustment when a previous adjustment was the switching based adjustment, otherwise, perform the switching based adjustment when the previous adjustment was the motorised electromechanical adjustment.

5. The control unit according to claim 1, wherein the processor is further configured to set the threshold level based on historical antenna configuration parameters.

6. The control unit according to claim 1, wherein the processor is further configured to set the threshold level based on feedback exchanged between at least two transceivers.

7. The control unit according to claim 1, wherein the processor is further configured to set the threshold level based on at least one of a network load and a number of active user equipment.

8. The control unit according to claim 1, wherein the latency related measurement value comprises at least one of a capability parameter, latency requirement, and measurements of channel capacity.

9. A method, applied to a control unit which comprises a receiver and a processor, the method comprising:
   receiving, by the receiver of the control unit, a latency related measurement value; and
   determining, by the processor of the control unit, an antenna configuration parameter for a transceiver, including:
      selecting a switching based adjustment based on a configuration mode, when the received latency related measurement value exceeds a threshold level, or
      when the received latency related measurement value is below the threshold level, selecting the antenna configuration parameter for a motorised electromechanical adjustment.

10. The method according to claim 9, further comprising:
    determining, by the processor of the control unit, the antenna configuration parameter by selecting the configuration mode from a set of configuration modes, wherein the configuration mode further comprises a predetermined antenna configuration parameter.

11. The method according to claim 10, further comprising:
    receiving, by the receiver of the control unit, a channel capacity measurement value; and
    wherein determining the antenna configuration parameter comprises:
    selecting, by the processor of the control unit, the configuration mode from the set of configuration modes, with a highest relative channel capacity with respect to the channel capacity measurement value.

12. The method according to claim 9, wherein
    determining the antenna configuration parameter comprises:
    performing, by the processor of the control unit, the motorised electromechanical adjustment when a previous adjustment was the switching based adjustment, otherwise, performing the switching based adjustment when the previous adjustment was the motorised electromechanical adjustment.

13. The method according to claim 9, further comprising: setting, by the processor of the control unit, the threshold level based on historical antenna configuration parameters.

14. The method according to claim 9, further comprising: setting, by the processor of the control unit, the threshold level based on feedback exchanged between at least two transceivers.

15. The method according to claim 9, further comprising: setting, by the processor of the control unit, the threshold level based on at least one of a network load and a number of active user equipment.

16. The method according to claim 9, wherein the latency related measurement value comprises at least one of a capability parameter, latency requirement, and measurements of channel capacity.

17. A non-transitory computer readable medium storing processor-executable instructions which when executed by a processor cause the processor to perform a method comprising:
  receiving a latency related measurement value; and
  determining an antenna configuration parameter for a transceiver, including:
    selecting a switching based adjustment based on a configuration mode, when the received latency related measurement value exceeds a threshold level, or
    when the received latency related measurement value is below the threshold level, selecting the antenna configuration parameter for a motorised electromechanical adjustment.

18. A switching unit comprising:

a processor; and a memory storing processor-executable instructions which when executed cause the processor to receive an antenna configuration parameter; and couple an input receiving data packet based on the antenna configuration parameter to an antenna subarray for signal transmission,
  wherein the coupling includes performing a motorised electromechanical adjustment when a previous adjustment was a switching-based adjustment, otherwise, performing the switching-based adjustment when the previous adjustment was the motorised electromechanical adjustment.

19. The non-transitory computer readable medium according to claim 17, wherein the method further comprises:

determining the antenna configuration parameter by selecting the configuration mode from a set of configuration modes, wherein the configuration mode further comprises a predetermined antenna configuration parameter.

* * * * *